(12) United States Patent
Fukawa (10) Patent No.: US 7,002,713 B2
(45) Date of Patent: Feb. 21, 2006

(54) IMAGE PROCESSING APPARATUS (75) Inventor: Kimihiko Fukawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 09/902,703

(22) Filed: Jul. 12, 2001

(65) Prior Publication Data

US 2002/0054385 A1   May 9, 2002

(30) Foreign Application Priority Data

Jul. 27, 2000  (JP) .............................. 2000-227000

(51) Int. Cl.
*H04N 1/04* (2006.01)
*H04N 3/14* (2006.01)
*H01L 27/00* (2006.01)
*H01L 27/148* (2006.01)

(52) U.S. Cl. ...................... 358/483; 358/482; 358/474; 250/208.1; 348/315; 257/241; 257/240; 257/249

(58) Field of Classification Search ................ 358/253, 358/254, 483, 482; 250/208.1; 348/315; 257/241, 240, 249
See application file for complete search history.

(56) References Cited

U.S. PATENT DOCUMENTS

| 4,438,457 A | * | 3/1984 | Tandon et al. .............. 348/316 |
| 4,875,099 A | * | 10/1989 | Sakai et al. .................. 358/483 |
| 6,507,011 B1 | * | 1/2003 | Ang ........................ 250/208.1 |

* cited by examiner

*Primary Examiner*—Edward Coles
*Assistant Examiner*—Houshang Safaipour
(74) *Attorney, Agent, or Firm*—Fitzpatrick, Cella, Harper & Scinto (57) ABSTRACT

An image processing apparatus capable of acquiring a high resolution image without a reduction in sensitivity includes a plurality of sensor chips connected to one another, each sensor chip including a first pixel row and a second pixel row, which are formed on the same semiconductor chip. The first pixel row has a plurality of pixels arranged in the main scanning direction, and the second pixel row has a plurality of pixels shifted along the main scanning direction with respect to the first pixel row.

17 Claims, 7 Drawing Sheets

IMAGE PROCESSING APPARATUS

BACKGROUND OF THE INVENTION

1. Field of the Invention

The present invention relates to an image processing apparatus such as a scanner.

2. Description of the Related Art

Typically, an image processing apparatus incorporating a contact image sensor (hereinafter referred to as "CIS") has a pixel arrangement in sensor chips of the CIS in which pixels are aligned in a line along the main scanning direction. In such an image processing apparatus, signals from the pixels are output from the sensor chips through a single output unit, where image processing operations such as analog-to-digital (A/D) conversion and shading compensation are performed.

There has been an increasing demand for a high resolution image processing apparatus incorporating a CCD (charge coupled device) with a reduction optical system, as well as a high resolution image processing apparatus incorporating a CIS. Since the CIS is a non-magnifying optical system, it essentially requires pixels with small light receiving units in order to provide high resolution; however, in this case, it is difficult to maintain the sensitivity of the CIS at the desired level.

SUMMARY OF THE INVENTION

Accordingly, it is an object of the present invention to provide an image processing apparatus capable of acquiring a high resolution image without a reduction in sensitivity.

To this end, in one aspect of the present invention, an image processing apparatus includes a plurality of sensor chips connected to one another, each sensor chip having a first pixel row and a second pixel row formed on the same semiconductor chip. The first pixel row has a plurality of pixels aligned in the main scanning direction, and the second pixel row has a plurality of pixels aligned in the main scanning direction and shifted with respect to the first pixel row.

Further objects, features and advantages of the present invention will become apparent from the following description of the preferred embodiments with reference to the attached drawings.

DESCRIPTION OF THE PREFERRED EMBODIMENTS

An image processing apparatus according to one embodiment of the present invention is described in detail with reference to the drawings.

Figure 1:
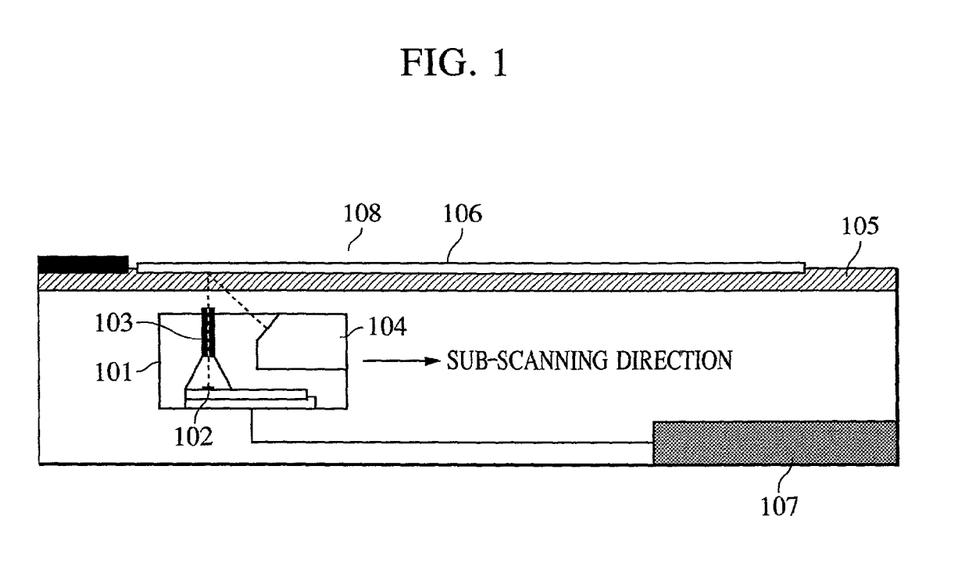
FIG. 1 is an overall illustration of an image processing apparatus according to the present invention.

FIG. 1 illustrates an image processing apparatus 108 according to one embodiment of the present invention. The structure of the image processing apparatus 108 is described with reference to FIG. 1.

A contact image sensor (CIS) 101 includes a light guide unit 104 for emitting light from an LED source (not shown) to an original document 106 on a document-placing glass plate 105, and a multichip sensor 102 for receiving the light reflected by the original document 106 through a lens array 103. As a carriage incorporating the CIS 101 travels along the sub-scanning direction, the output signal from the CIS 101 is processed by a signal processing circuit 107, where a control signal is received or an image signal is transmitted via an interface from and to an external device, such as a personal computer, which is a host unit of the image processing apparatus 108.

Figure 2:
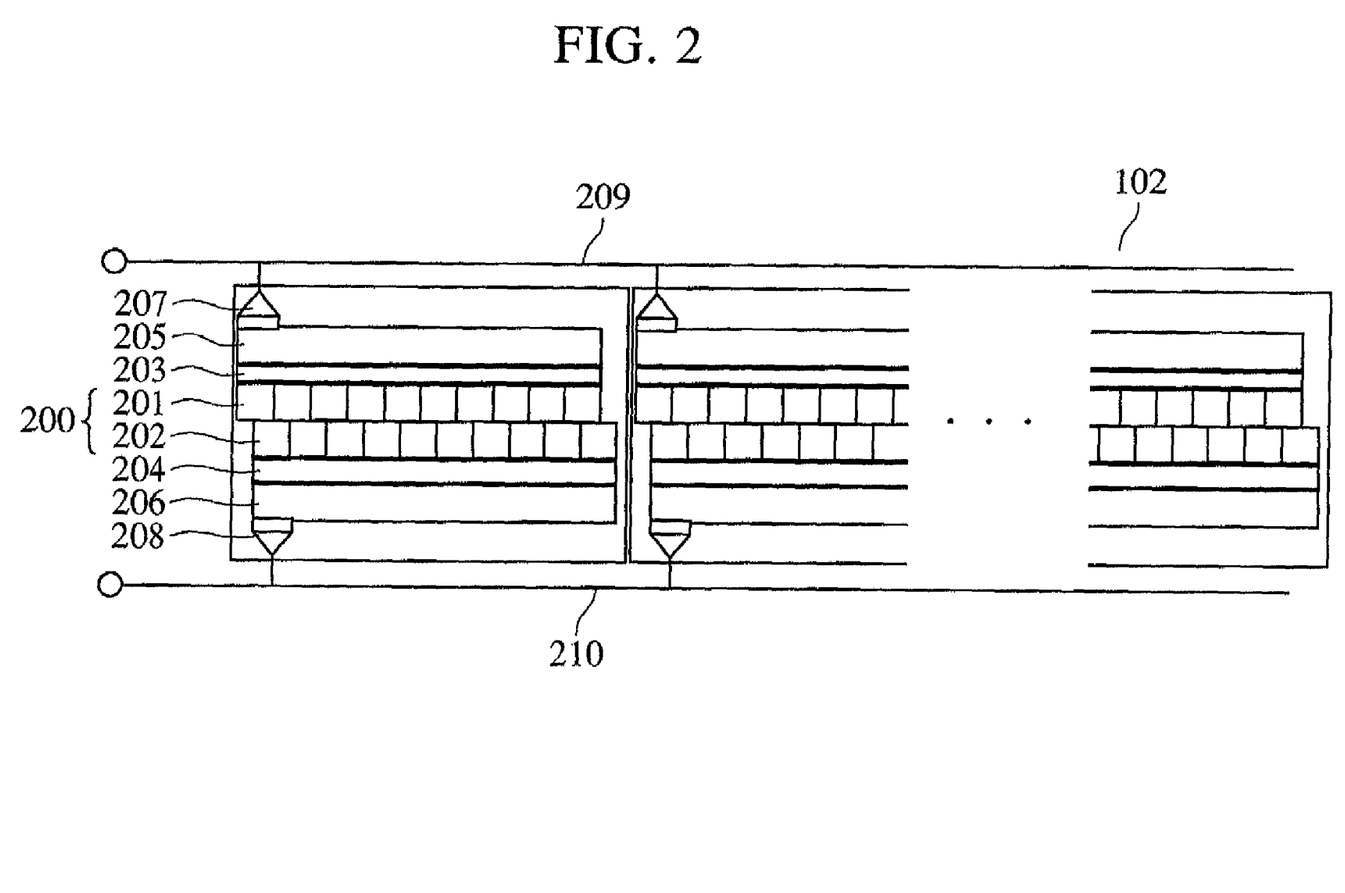
FIG. 2 is an illustration of a multichip sensor.
Figure 3:
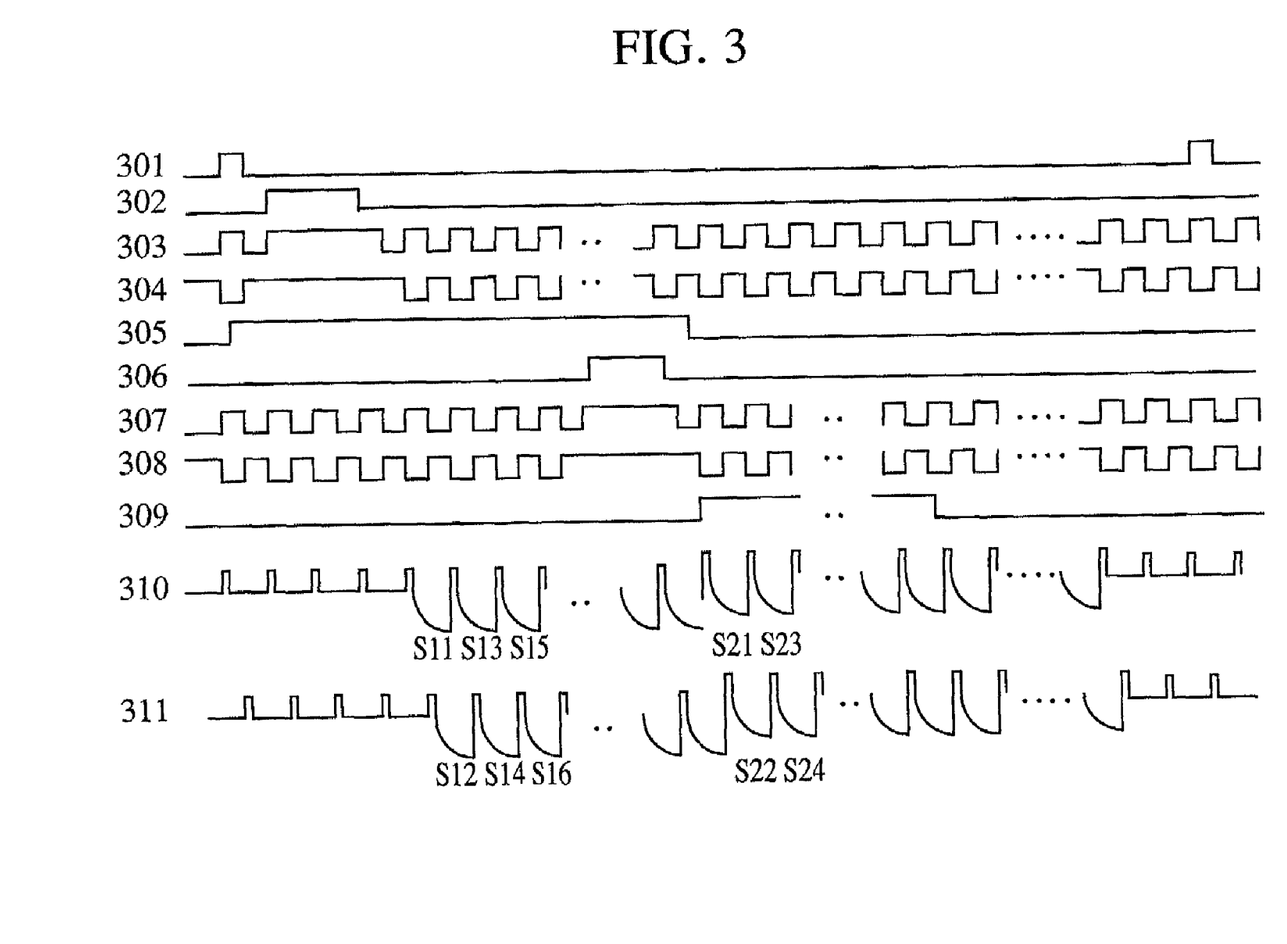
FIG. 3 is an operational timing chart of the multichip sensor.

FIG. 2 is a schematic view of the multichip sensor 102 having a plurality of sensor chips connected electrically to one another on the same substrate, which serves as an imaging device of the contact image sensor (CIS) 101 in the image processing apparatus 108. FIG. 3 is an operational timing chart of the multichip sensor 102 shown in FIG. 2. The structure and operation of the multichip sensor 102 are described with reference to FIGS. 2 and 3.

Referring first to FIG. 2, an imaging region 200 for capturing an object image of the original document or the like includes a first pixel row 201 having a plurality of pixels aligned in the main scanning direction, and a second pixel row 202 having a plurality of pixels aligned in the main scanning direction. Each of the pixels is shaped into a square with one side measuring 22 $\mu$m, and the first and second pixel rows 201 and 202 each provide a resolution of 1200 dpi (dots per inch) in the main scanning direction. The second pixel row 202 is shifted by half the pixel pitch, or by 11$\mu$m, with respect to the first pixel row 201 along the main scanning direction. When the output signal from the first pixel row 201 is combined with the output signal from the second pixel row 202, the image processing apparatus 108 provides a resolution of 2400 dpi in the main scanning direction. The line pitch of the first pixel row 201 and the second pixel row 202 in the sub-scanning direction is equal to the distance between the centers of the pixels in the main scanning direction.

The charges which accumulate in the light receiving units in the first pixel row 201 and the second pixel row 202 of each sensor chip are transferred to a first storage unit 203 and a second storage unit 204, respectively, according to a main scan line synchronization signal 301 shown in FIG. 3, and the light receiving units are ready to accumulate the charges for the next line. Then, the charges stored in the first storage unit 203 and the second storage unit 204 on a first sensor chip are transferred to a first shift register (first readout circuit) 205 and a second shift register (second readout circuit) 206, respectively, according to a readout signal 302. While the signal charges are transferred from the first storage unit 203 and the second storage unit 204 to the first shift register 205 and the second shift register 206, respectively, the first and second shift registers 205 and 206 halt according to a first clock signal 303 and a second clock signal 304, respectively.

Thereafter, the charge transferred to the first shift register 205 is output as a pixel signal 310 (S11, S13, etc.) to a first output line 209 through a first output unit 207 according to the first clock signal 303. The charge transferred to the second shift register 206 is output as a pixel signal 311 (S12, S14, etc.) to a second output line 210 through a second output unit 208 according to the second clock signal 304.

The first sensor chip is active when an operational determination signal 305 is high, and terminates the output operation when the operational determination signal 305 is low. Then, an operational determination signal 309 for a second sensor chip becomes high, and the pixel signals 310 (S21, S23, etc.) and 311 (S22, S24, etc.) are output from the second sensor chip in response to a readout signal 306 and clock signals 307 and 308 which are transmitted from the first and second storage units 203 and 204 to the first and second shift registers 205 and 206 on the second sensor chip.

The same operation is performed in turn on a third sensor chip, followed by a fourth sensor chip, in which the charges stored in the first and second storage units 203 and 204 are transferred to the first and second shift registers 205 and 206, and are sequentially output.

Figure 4:
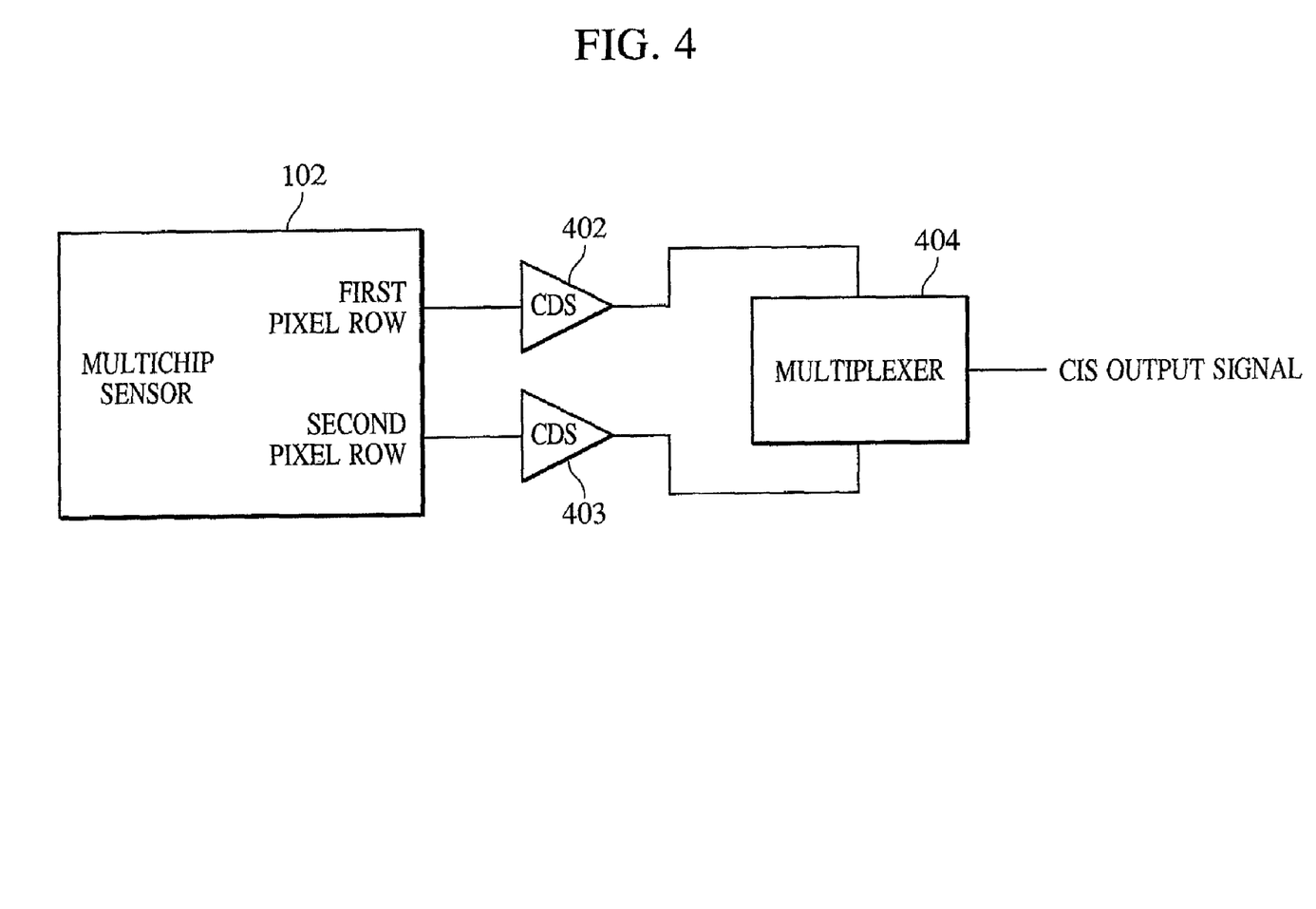
FIG. 4 is a partial block diagram of a contact image sensor (CIS)

Referring to FIG. 4, the pixel signals from the first output line 209 and the second output line 210 of the multichip sensor 102 shown in FIG. 2 are combined by a multiplexer 404 located outside the multichip sensor 102. The combination of the pixel signal from the first pixel row with the pixel signal from the second pixel row in the image processing apparatus 108 is described with reference to the block diagram in FIG. 4 and the operational timing chart in FIG. 5.

Figure 5:
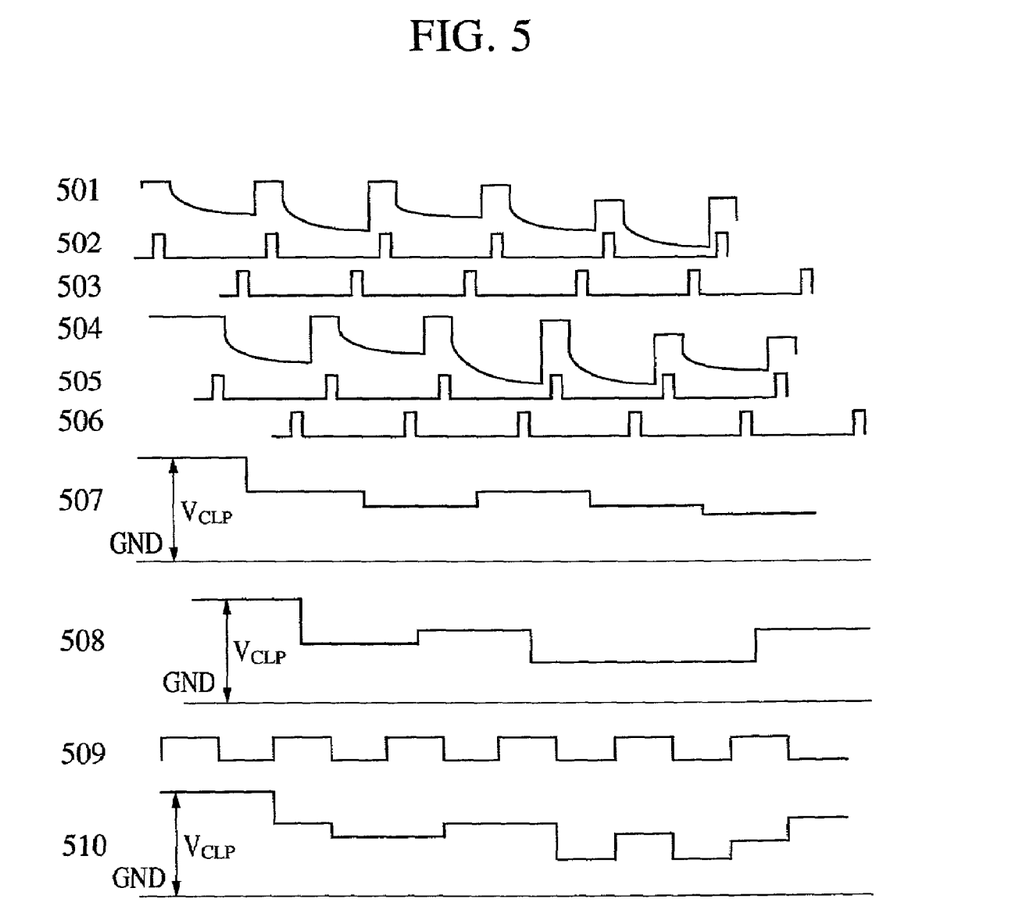
FIG. 5 is an operational timing chart of a correlated double sampling (CDS) circuit and a multiplexer.

A pixel signal 501 from the first pixel row of the multichip sensor 102 is passed to a correlated double sampling (CDS) circuit (reference level adjusting circuit) 402, and the difference between the reference level of each pixel and the signal level is output as an output signal 507 according to a clamping signal 502 and a sampling signal 503 based on the reference potential ($V_{CLP}$).

Likewise, a pixel signal 504 from the second pixel row is passed to the CDS circuit 403, and the difference between the reference level of each pixel and the signal level is output as an output signal 508 according to a clamping signal 505 and a sampling signal 506 based on the reference potential ($V_{CLP}$).

The output signals 507 and 508 are then input to the multiplexer (combining circuit) 404, where the output signal 507 of the first pixel row is selected when a multiplexer input pulse 509 is high, and the output signal 508 of the second pixel row is selected when the multiplexer input pulse 509 is low. Therefore, an output signal 510 of the multiplexer 404 is output as an analog signal of one line in which the output signal 507 of the first pixel row and the output signal 508 of the second pixel row have been alternately output (combined).

Since the image processing apparatus 108 in the present embodiment incorporates a multichip sensor having a plurality of sensor chips connected to one another, if each of the sensor chips contains a circuit for combining the signal from the first pixel row with the signal from the second pixel row, the portion where the circuit is located forms an insensitive region, and the resulting image is not continuous between two sensor chips. In order to avoid such an inconvenience, the multiplexer 404, which is located outside the sensor chips, as shown in FIG. 4, requires no combining circuit between two sensor chips, thereby creating a continuous image. Furthermore, since one multiplexer is not provided for each sensor chip but is commonly used by a plurality of sensor chips such that the signal is input from a first sensor chip to the multiplexer in a sequential manner, a compact image processing apparatus may be realized. The CDS circuits provided before the multiplexer may provide an accurate sampling between the reference level and the signal level.

The output signal from the multiplexer 404 in the CIS 101 is processed by the signal processing circuit 107. The operation of the signal processing circuit 107 is described with reference to FIG. 6.

Figure 6:
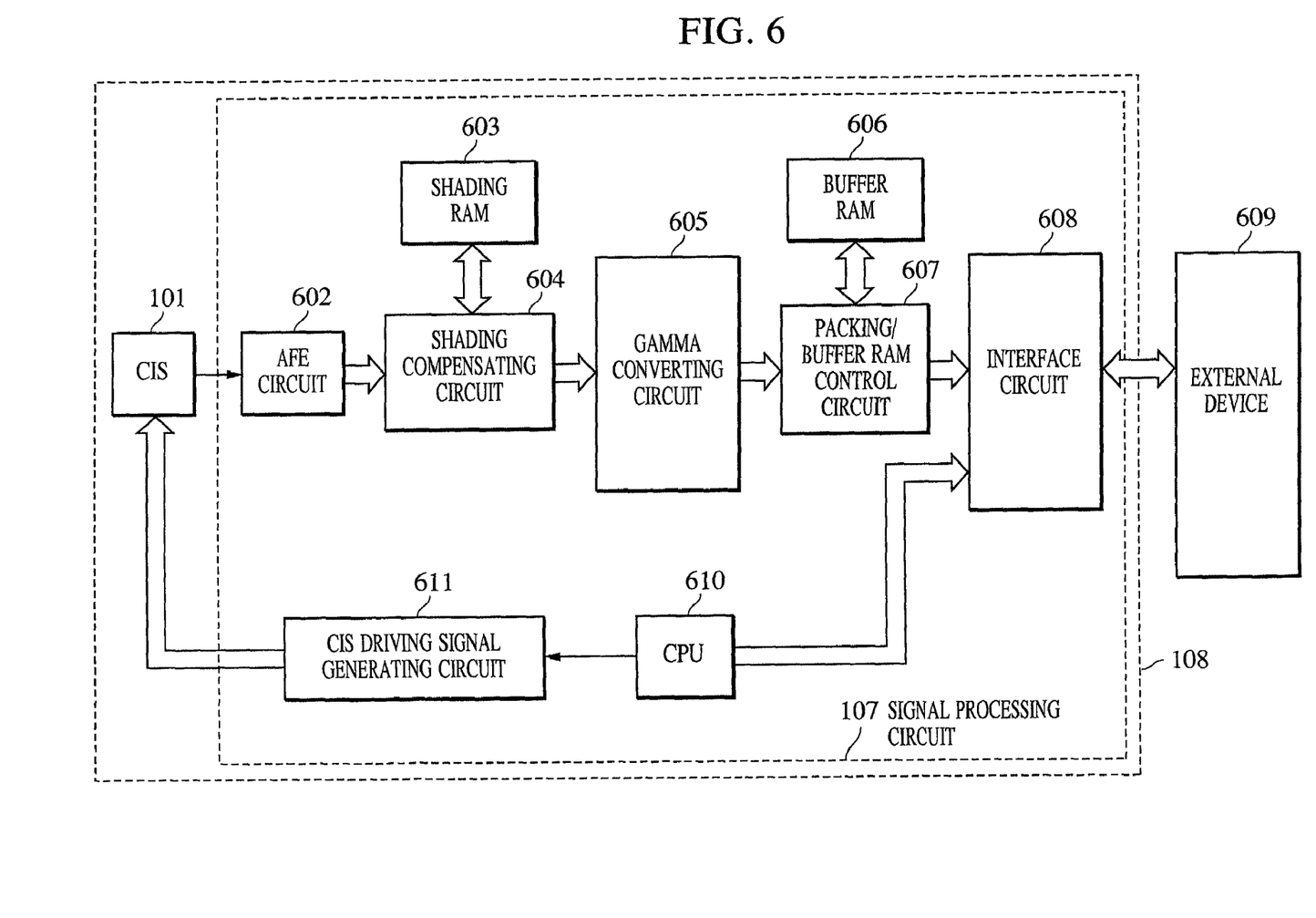
FIG. 6 is a detailed block diagram of a signal processing circuit.

The signal processing circuit 107 includes an analog front end (AFE) circuit 602, a shading RAM 603, a shading compensating circuit 604, a gamma converting circuit 605, a buffer RAM 606, a packing/buffer RAM control circuit 607, an interface circuit 608, a central processing unit (CPU) 610, and a driving signal generating circuit (driving circuit) 611.

The AFE circuit 602 is an analog preprocessor for performing processing operations, such as amplification, DC offset correction, and A/D conversion, on the signal output from the CIS 101 so that 12-bit digital image data may be finally output, by way of example.

The shading RAM 603 contains, as shading compensation data, the reference level data which is created by the CIS 601 reading a standard white sheet. Based on the data contained in the shading RAM 603, the shading compensating circuit 604 performs a shading compensation on the image data created by reading the original document.

The gamma converting circuit 605 performs a gamma correction on the read image data according to a gamma curve which is previously defined by a host computer.

The buffer RAM 606 is a RAM for linearly storing the image data so as to provide synchronization between the actual read operation and the communication with the host computer.

The packing/buffer RAM control circuit 607 performs the packing operation according to the image output mode (i.e., binary, 4-bit (16 levels), 8-bit (256 levels), or 24-bit) which is previously determined by the host computer, before writing the resulting data into the buffer RAM 606, and reads the image data from the buffer RAM 606 into the interface circuit 608 for outputting.

The interface circuit 608 interfaces with an external device 609, which becomes a host device of the image processing apparatus 108, such as a personal computer, through which a control signal is received and an image signal is transmitted from and to the external device 609.

The driving circuit 611 supplies clock pulses as shown in FIG. 3 to the multichip sensors in the CIS 101 and clock pulses as shown in FIG. 5 to the CDS circuits 402 and 403 and the multiplexer 404 according to an instruction from the CPU 610.

As described above, in the illustrated embodiment, the signal from the first pixel row and the signal from the second pixel row are combined while these signals are analog signals (before the A/D converting circuit). However, such a combination may be performed after these signals have been converted to digital signals (after the A/D converting circuit), as shown in FIG. 7.

Figure 7:
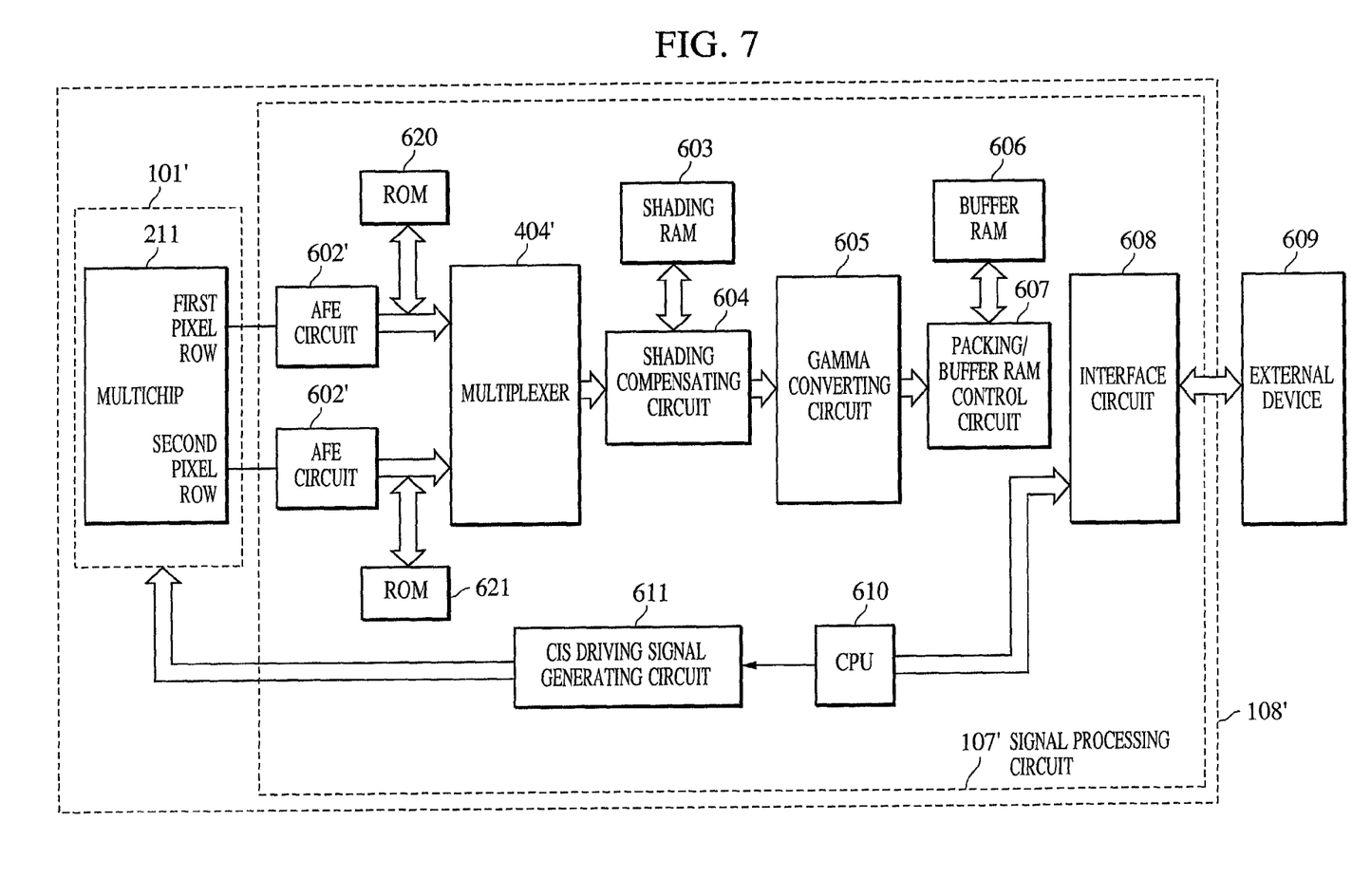
FIG. 7 is a detailed block diagram of another signal processing circuit.

Specifically, in the image processing apparatus 108' shown in FIG. 7, the signals from the first and second pixel rows in the CIS 101' are converted to digital signals by A/D converting circuits contained in the AFE circuits 602', and the results are initially stored in ROMs (read only memories) 620 and 621 before being combined by the multiplexer 404'. In this case, the functionality of the CDS circuits 402 and 403 is involved in the AFE circuits 602'. The following procedure is the same as that previously described with reference to FIG. 6.

While the image processing apparatus 108 or 108' includes the shading compensating circuit 604, etc., the processing after the shading compensating circuit 604 and the processing of the CPU 610 may be performed by an external device to simplify the signal processing in the image processing apparatus 108 or 108'.

In the illustrated embodiment, the line pitch of a pixel row in the sub-scanning direction is one-line pitch. However, each pixel may be shaped as a rectangle in which a light receiving unit is elongated in the sub-scanning direction so that the line pitch in the sub-scanning direction may be an integer multiple greater than one, in order to improve the sensitivity.

Alternatively, the size of pixels in the main scanning direction may be reduced to make the non-light-receiving areas between the pixels larger. This may increase the distances from the end faces of the sensor chips, and may increase the modulation transfer function (MTF).

Although a sensor chip having the CCD configuration has been described in the illustrated embodiment, other types of sensor chips including a MOS sensor chip may be used.

According to the present invention, therefore, an image processing apparatus which increases the resolution without reduction in the area of the light receiving units of the pixels is achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for sensing an image and for generating data representing the image comprising:
a plurality of sensor chips connected to one another and positioned relative to each other so as to collectively receive a continuous image extending over multiple ones of said sensor chips without an insensitive region therebetween caused by circuit wiring, each sensor chip including a first pixel row and a second pixel row , which are formed on the same semiconductor chip, the first pixel row having a plurality of pixels arranged in a main scanning direction, and the second pixel row having a plurality of pixels shifted along the main scanning direction with respect to the first pixel row.

2. An image processing apparatus for sensing an image and for generating data representing the image comprising:
a plurality of sensor chips connected to one another and positioned relative to each other so as to collectively receive a continuous image extending over multiple ones of said sensor chips without an insensitive region therebetween caused by circuit wiring, each sensor chip including a first pixel row and a second pixel row , which are formed on the same semiconductor chip, the first pixel row having a plurality of pixels arranged in a main scanning direction, and the second pixel row having a plurality of pixels shifted along the main scanning direction with respect to the first pixel row.

3. An image processing apparatus according to claim 2, further comprising an analog-to-digital converting circuit arranged to receive an output from said combining circuit,
wherein the signals from said first pixel row and said second pixel row of each of said plurality of sensor chips are selectively outputted by said combining circuit as a resulting signal, and the resulting signal is converted into a digital signal by said analog-to-digital converting circuit.

4. An image processing apparatus according to claim 2, further comprising an analog-to-digital converting circuit,
wherein the signals from said first pixel row and said second pixel row of each of said plurality of sensor chips are converted into digital signals by said analog-to-digital converting circuit, and the digital signals are selectively outputted.

5. An image processing apparatus according to claim 2, further comprising:
a first reference level adjusting circuit, configured to receive from said first output line the first pixel signals from each of said plurality of sensor chips and to adjust the reference level of the first pixel signals from each of said plurality of sensor chips; and
a second reference level adjusting circuit, configured to receive from said second output line the second pixel signals from each of said plurality of sensor chips and to adjust the reference level of the second pixel signals from each of said plurality of sensor chips,
wherein said first reference level adjusting circuit and said second reference level adjusting circuit are provided before said combining circuit.

6. An image processing apparatus for sensing an image and for generating and transmitting data representing the image comprising:
a plurality of sensor chips connected to one another and whose imaging regions are positioned relative to each other so as to collectively receive a continuous image extending over multiple ones of said sensor chips without an insensitive region therebetween caused by circuit wiring, each of said plurality of sensor chip including:
an imaging region;
a first readout circuit;
a second readout circuit;
a first output unit; and
a second output unit,
wherein said plurality of sensor chips are formed on the same semiconductor chip,
wherein each imaging region of each of said plurality of sensor chips has a first imaging region and a second imaging region, each having a plurality of pixels arranged in a main scanning direction,
wherein said first readout circuit of each of said plurality of sensor chips is configured to selectively read a signal from each of said plurality of pixels in said first imaging region of the sensor chip to which said first readout circuit belongs,
wherein said second readout circuit of each of said plurality of sensor chips is conflaured to selectively read a signal from each of said plurality of pixels in said second imaging region of the sensor chip to which said second readout circuit belongs,
wherein said first output unit of each of said plurality of sensor chips is configured to output the signal read by said first readout circuit of the sensor chip to which said first output unit belongs, and wherein said second output unit of each of said plurality of sensor chips is configured to output the signal read by said second readout circuit of the sensor chip to which said second output unit belongs;

a first output line provided outside said plurality of sensor chips, to which signals from each first pixel row in each of said plurality of sensor chips is read through each of said first readout circuits and each of said first output units of said plurality of sensor chips; and a second output line provided outside said plurality of sensor chips, to which a signals from each second pixel row in each of said plurality of sensor chips is read through each of said second readout circuits and each of said second output units of said plurality of sensor chips;

a driving circuit, which drives said plurality of sensor chips to sequentially output signals to said first output line and said second output line from said first output unit and said second output unit, respectively; and a combining circuit provided outside said plurality of sensor chips, which selectively outputs the signals from said first output line and said second output line, wherein said combining circuit is common to said plurality of sensor chips.

7. An image processing apparatus according to claim 6, further comprising an analog-to-digital converting circuit arranged to receive an output of said combining circuit, wherein the signals from said first imaging region and said second imaging region of each of said plurality of sensor chips are selectively outputted by said combining circuit, and the resulting signal is converted into a digital signal by said analog-to-digital converting circuit.

8. An image processing apparatus according to claim 6, further comprising an analog-to-digital converting circuit, wherein the signals from said first imaging region and said second imaging region are converted into digital signals by said analog-to-digital converting circuit, and the digital signals are selectively outputted.

9. An image processing apparatus according to claim 6, further comprising:

a first reference level adjusting circuit, configured to receive from said first output line the signals from each of said plurality of pixels of each first imaging region of said plurality of sensor chips and to adjust the reference level of the signals from each of said plurality of pixels of each first imaging region of said plurality of sensor chips; and a second reference level adjusting circuit, configured to receive from said second output line the signals from each of said plurality of pixels of each second imagine region of said plurality of sensor chips and to adjust the reference level of the signals from each of said plurality of pixels of each second imaging region of said plurality of sensor chips, wherein said first reference level adjusting circuit and said second reference level adjusting circuit are provided before said combining circuit.

10. An image processing apparatus according to claim 1, wherein the second pixel row is positioned to be offset by half the pixel pitch in the main scanning direction with respect to the first pixel row.

11. An image processing apparatus according to claim 1, wherein the first pixel and the last pixel in each of said plurality of sensor chips are arranged in different pixel rows.

12. An image processing apparatus according to claim 1, wherein the number of pixels in the first pixel row is equal to the number of pixels in the second pixel row in each of said plurality of sensor chips.

13. An image processing apparatus according to claim 1, wherein the first pixels in all of said plurality of sensor chips are positioned in the same pixel row.

14. An image processing apparatus according to claim 1, wherein the distance in a sub-scanning direction between the center of the first pixel row and the center of the second pixel row in each of said plurality of sensor chips is an integer multiple of the pixel pitch in the main scanning direction.

15. An image processing apparatus according to claim 1, further comprising:

a light source, positioned to emit light to illuminate an original document; and a lens array, configured and positioned to guide light reflected from the original document to said plurality of sensor chips.

16. An image processing apparatus according to claim 2, further comprising:

a light source, positioned to emit light to illuminate an original document; and a lens array, configured and positioned to guide light reflected from the original document to said plurality of sensor chips.

17. An image processing apparatus according to claim 6, further comprising:

a light source, positioned to emit light to illuminate an original document; and a lens array, configured and positioned to guide light reflected from the original document to said plurality of sensor chips.

* * * * *

UNITED STATES PATENT AND TRADEMARK OFFICE
CERTIFICATE OF CORRECTION

PATENT NO. : 7,002,713 B2
APPLICATION NO. : 09/902703
DATED : February 21, 2006
INVENTOR(S) : Kimihiko Fukawa It is certified that error appears in the above-identified patent and that said Letters Patent is hereby corrected as shown below:

COLUMN 5

Line 54, "row." should read
--row;
 a first output line, connected to each first pixel row of each of said plurality of sensor chips to receive first pixel signals from each first pixel row of each of said plurality of sensor chips; and
 a second output line, connected to each second pixel row of each of said plurality of sensor chips to receive second pixel signals from each second pixel row of each of said plurality of sensor chips.--;
Line 62, "row," should read --row,--;
Line 67, "row." should read
--row;
 a first output line provided outside said plurality of sensor chips, to which a signal from said first pixel row in each of said plurality of sensor chips is read; and
 a second output line provided outside said plurality of sensor chips, to which a signal from said second pixel row in each of said plurality of sensor chips is read;
 a driving circuit, which drives said plurality of sensor chips to sequentially output signals to said first output line and said second output line; and
 a combining circuit provided outside said plurality of sensor chips and connected to said first and second output lines to receive signals from said first and second output lines from the first and second pixel

UNITED STATES PATENT AND TRADEMARK OFFICE
CERTIFICATE OF CORRECTION

PATENT NO. : 7,002,713 B2
APPLICATION NO. : 09/902703
DATED : February 21, 2006
INVENTOR(S) : Kimihiko Fukawa It is certified that error appears in the above-identified patent and that said Letters Patent is hereby corrected as shown below:

COLUMN 5 (Cont'd)

rows of each of said plurality of sensor chips, which selectively outputs the signals from said first output line and said second output line, wherein said combining circuit is common to said plurality of sensor chips.--

COLUMN 6

Line 40, "chip" should read --chips--; and
Line 60, "conflaured" should read --configured--.

COLUMN 7

Line 11, "signals" should read --signal--.

COLUMN 8

Line 1, "imagine" should read --imaging--.

Signed and Sealed this

Third Day of October, 2006

JON W. DUDAS
*Director of the United States Patent and Trademark Office*